United States Patent
Zhong et al.

(10) Patent No.: US 11,163,792 B2
(45) Date of Patent: Nov. 2, 2021

(54) WORK ASSIGNMENT IN PARALLELIZED DATABASE SYNCHRONIZATION

(71) Applicant: International Business Machines Corporation, Armonk, NY (US)

(72) Inventors: Jia Heng Zhong, San Jose, CA (US); Daniel Martin, Stuttgart (DE); Sowmya Kameswaran, San Jose, CA (US); Manogari Nogi Simanjuntak, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 16/424,744

(22) Filed: May 29, 2019

(65) Prior Publication Data

US 2020/0380011 A1  Dec. 3, 2020

(51) Int. Cl.
*G06F 15/16* (2006.01)
*G06F 16/27* (2019.01)
*G06F 9/48* (2006.01)

(52) U.S. Cl.
CPC ............ *G06F 16/27* (2019.01); *G06F 9/4881* (2013.01)

(58) Field of Classification Search
None
See application file for complete search history.

(56) References Cited

U.S. PATENT DOCUMENTS

| | | |
|---|---|---|
| 5,995,980 A | 11/1999 | Olsen et al. |
| 6,973,464 B1 | 12/2005 | Gao |
| 7,240,054 B2 | 7/2007 | Adiba et al. |
| 7,380,081 B2 | 5/2008 | Ji et al. |
| 7,644,107 B2* | 1/2010 | Neagovici-Negoescu ................... G06F 16/95 707/715 |
| 8,352,425 B2 | 1/2013 | Bourbonnais et al. |
| 8,688,634 B2 | 4/2014 | Beyer et al. |
| 8,909,605 B1* | 12/2014 | Li .................... G06F 16/24568 707/681 |
| 9,015,116 B2 | 4/2015 | Cadarette et al. |
| 9,514,170 B1* | 12/2016 | Tillotson ................. G06F 9/546 |
| 9,817,879 B2 | 11/2017 | Martin et al. |
| 10,216,820 B1 | 2/2019 | Holenstein et al. |
| 2003/0208511 A1 | 11/2003 | Earl et al. |
| 2006/0212429 A1* | 9/2006 | Bruno ............... G06F 16/24542 |
| 2008/0071811 A1* | 3/2008 | Parkinson ........... H04L 61/1523 |

(Continued)

*Primary Examiner* — Alex Gofman
(74) *Attorney, Agent, or Firm* — Yee & Associates, P.C.

(57) ABSTRACT

A computer-implemented method, system, and non-transitory computer program product for work assignment for parallelized database synchronization. Data changes to a source database are identified from a change log for the source database. The data changes are batched into data change chunks of data changes. An estimated processing cost for processing of each of the data change chunks to apply the data changes in the data change chunks to a target database is determined. A priority queue in which the data change chunks are identified in order of estimated processing cost is generated. Each data change chunk identified in the priority queue is assigned to a processing thread in a plurality of processing threads for processing in order by estimated processing cost from higher estimated processing cost to lower estimated processing cost to apply the data changes in the data change chunks to the target database.

14 Claims, 8 Drawing Sheets

(56) References Cited

U.S. PATENT DOCUMENTS

2016/0110439 A1* 4/2016 Hrle .................. G06F 16/273
  707/600
2016/0203171 A1* 7/2016 Gangadharappa ...... G06F 16/27
  707/741

* cited by examiner

WORK ASSIGNMENT IN PARALLELIZED DATABASE SYNCHRONIZATION

BACKGROUND

1. Field

The disclosure relates generally to database synchronization and more specifically to assigning work to processing threads in a parallelized database synchronization system and method. More particularly, illustrative embodiments relate to a computer implemented system and method and a computer program product for optimizing data replication from a source database into a target database, such as a column store data structure or accelerator, which contains a subset of the data from the source database and is used to run workloads.

2. Description of the Related Art

Database engines for online transaction processing, OLTP, are designed to process transactional workloads. Transactional workloads are typically write-heavy and are dominated by lookup-style queries at heavy concurrency. For example, database engines for online transaction processing may process thousands of transactions per second. As a result, these engines typically store data in row-major form to allow in-place updates with minimal input/output requirements and allow for configurable page sizes and bufferpool organization. In addition, database engines for online transaction processing usually offer different kinds of index implementations, such as hash, bitmap, clustered/non-clustered, or others, to optimize point lookup. The industry has standardized on a shared-everything architecture for such database engines, such as Db2 z/OS Datasharing with Sysplex, Db2 LUW Purescale, and Oracle RAC, which brings minimal call-path length for each query and hence minimal per-query latency, and distributes work on a query granularity across the cluster. This architecture works well, because online transaction processing systems are designed for massive query parallelism.

In contrast to this, database engines for online analytical processing, OLAP, are designed for read-heavy, data-intensive, low concurrency workloads. Typically, most of the data from a database needs to be read for each query in online analytical processing. This leads to column-major organization data pages to optimize input/output for the scan operations, maintenance of a reverse index, known as a ZoneMap or a Synopsis Table, to maximize data skipping of "uninteresting" value ranges during scans, and heavily parallelized query plans to maximize intra query parallelism and typically fixed, large page sizes and bufferpools. Moreover, because the expected query parallelism of the workload is low, but the queries themselves are scan-heavy, the scale-out strategy for database engines for online analytical processing is shared-nothing, or automatic "sharding". In this architecture, every node is exclusively responsible for a small part of a table. A query always causes work on all nodes as all data must be seen. This creates a comparably long codepath with large latencies, because network input/output is required, compared to online transaction processing engines, but maximizes intra-query parallelism as data scans can be done concurrently on all nodes.

In an enterprise, information typically originates in an online transaction processing system. This is where any business-relevant event, for example, a new sale, is usually persisted first. Low or "zero" latency analytics requires access to current data. However, the most current data originates on online transaction processing systems that are not designed for analytics. Efficient data replication from an online transaction processing system to an online analytical processing engine may sacrifice the integrity of the data by reordering workloads in favor of the target system. But this might lead to an inaccurate analytic result due to possible violation of the referential integrity of data tables from data reordering.

Therefore, it would be desirable to have a method and apparatus that take into account at least some of the issues discussed above, as well as other possible issues. For example, it would be desirable to have a method and apparatus that overcome technical problems with the synchronization of databases for online transaction processing and online analytical processing. In particular, a system and method that overcomes the technical problem of providing efficient data replication without sacrificing data integrity is desired.

SUMMARY

According to an illustrative embodiment, a computer-implemented method of work assignment for parallelized database synchronization is provided. Data changes to a source database are identified from a change log for the source database. The data changes are batched into data change chunks of data changes. An estimated processing cost for processing of each of the data change chunks to apply the data changes in the data change chunks to a target database is determined. A priority queue in which the data change chunks are identified in order of estimated processing cost is generated. Each data change chunk identified in the priority queue is assigned to a processing thread in a plurality of processing threads for processing in order by estimated processing cost from higher estimated processing cost to lower estimated processing cost to apply the data changes in the data change chunks to the target database.

According to another illustrative embodiment, a system for work assignment for parallelized database synchronization is provided. The system comprises a data processing system configured to: identify data changes to a source database from a change log for the source database, batch the data changes into data change chunks of data changes, determine an estimated processing cost for processing of each of the data change chunks to apply the data changes in the data change chunks to a target database, generate a priority queue in which the data change chunks are identified in order of estimated processing cost, and assign each data change chunk identified in the priority queue to a processing thread in a plurality of processing threads for processing in order by estimated processing cost from higher estimated processing cost to lower estimated processing cost to apply the data changes in the data change chunks to the target database.

According to yet another illustrative embodiment, a non-transitory computer readable storage medium storing program code also is provided. When executed by a processor, the program code performs a computer-implemented method of work assignment for parallelized database synchronization, comprising: identifying data changes to a source database from a change log for the source database, batching the data changes into data change chunks of data changes, determining an estimated processing cost for processing of each of the data change chunks to apply the data changes in the data change chunks to a target database, generating a priority queue in which the data change chunks are identified in order of estimated processing cost, and assigning each data change chunk identified in the priority queue to a processing thread in a plurality of processing threads for processing in order by estimated processing cost from higher estimated processing cost to lower estimated processing cost to apply the data changes in the data change chunks to the target database.

Other variations are possible, as described below.

DETAILED DESCRIPTION

Figure 1:
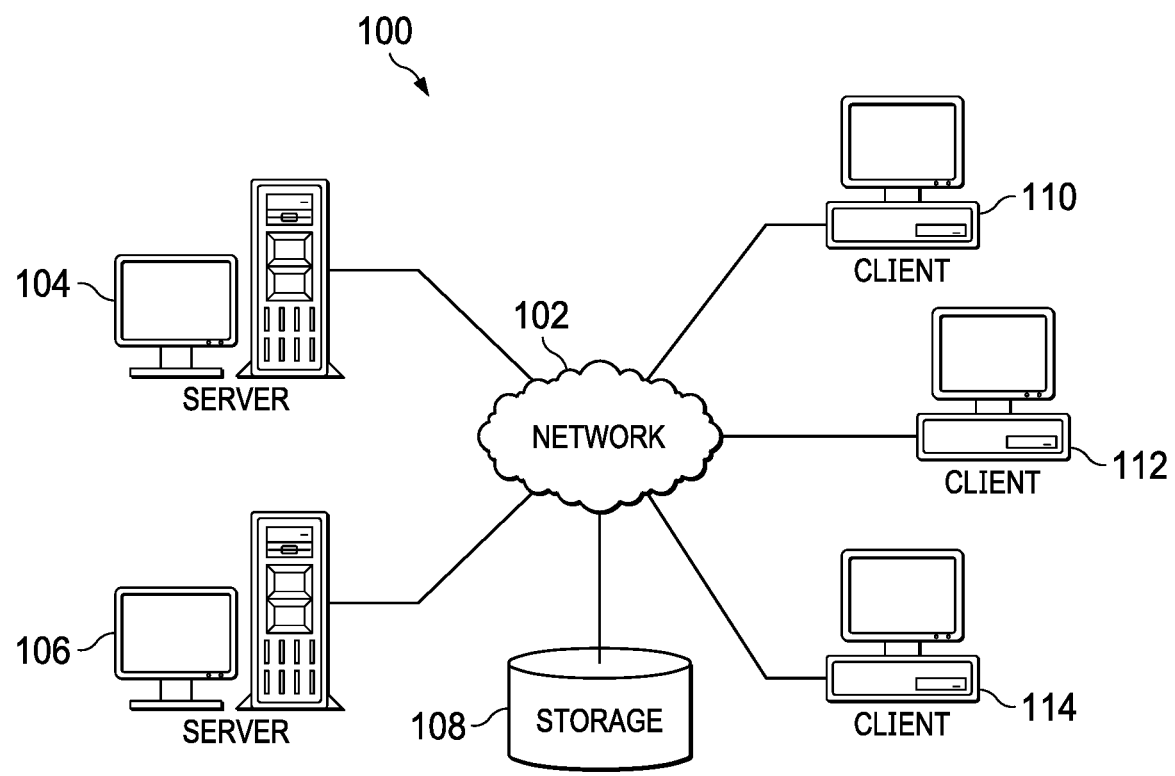
FIG. 1 is a pictorial representation of a network of data processing systems in which illustrative embodiments may be implemented.

The illustrative embodiments recognize and take into account that state of the art data replication systems are designed with parallel processing in mind to achieve maximum throughput. The replication process performed by such systems aims to unleash the full potential of an analytical database engine by allowing concurrent ingestion of data. Examples of such current state of the art systems are IBM Q Replication and IBM Infosphere CDC, which utilize parallel processing to replicate massive amount of transactional data into the target database.

Current processes of applying or replicating changes to table objects from a source relational database to a target relational database involve continuously collecting change logs of updated tables from the source database. The change logs may be run through a parser engine that will identify the changes in data in the rows of the source database and batch data changes into chunks of data organized by table. The parsed data is grouped into chunks by table information and then assigned to queues for multiple processing threads in order by the time that the data arrive in the parser. After all data change chunks are distributed, each thread will start to apply the changes to the target database, such as a column store data structure or accelerator, one at a time from its queue.

Illustrative embodiments provide an improved system and method to meet the above-mentioned requirements of maintaining query referential integrity on top of balanced workload distribution to get the most current data into a system designed for analytics. Illustrative embodiments provide parallel techniques for data synchronization between online transaction processing and online analytical processing database engines that better distribute workloads equally among concurrent replication threads on the target system while maintain referential integrity. Illustrative embodiments provide efficient data replication and improved data integrity using a processing cost estimate algorithm, the knowledge of incoming queries to the online analytical processing database, and dependency relationships between tables.

In accordance with an illustrative embodiment, change logs of updated tables from a source database are continuously collected. The change logs are run through a parser engine that identifies the changed data for rows of the source database and batches the data changes into chunks of data changes organized by table in a target database. A heuristic or cost function is applied to the data change chunks to organize the data change chunks by descending order of estimated processing cost into a priority queue. Various strategies may be used to process the data change chunks in the priority queue by a plurality of processing threads to apply the data changes to objects in the target database. In accordance with an illustrative embodiment, a balance is achieved between processing threads picking up highest cost data change chunks available first, to keep an even work distribution across threads, and applying data changes to the target database by maintaining referential integrity and query-based table dependency relationships.

Workload distribution and processing in accordance with an illustrative embodiment improves the efficiency of the parallel application of data changes to a target database by dynamically distributing workload to each individual processing thread while maintaining query referential integrity. Illustrative embodiments reduce the idle time of each individual processing thread since all threads share the same priority queue and the workloads with the highest estimated processing cost are processed first. As a result, the chance of an individual thread starving for work is reduced or minimized, and a parallelized database synchronization system in accordance with an illustrative embodiment may then achieve improved or maximum possible throughput provided by the parallel processing. Illustrative embodiments thus provide an advantage for Hybrid Transactional/Analytical Processing, HTAP, queries, which require low latency and high query referential integrity to produce fast and accurate results on the replicated data.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client devices 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
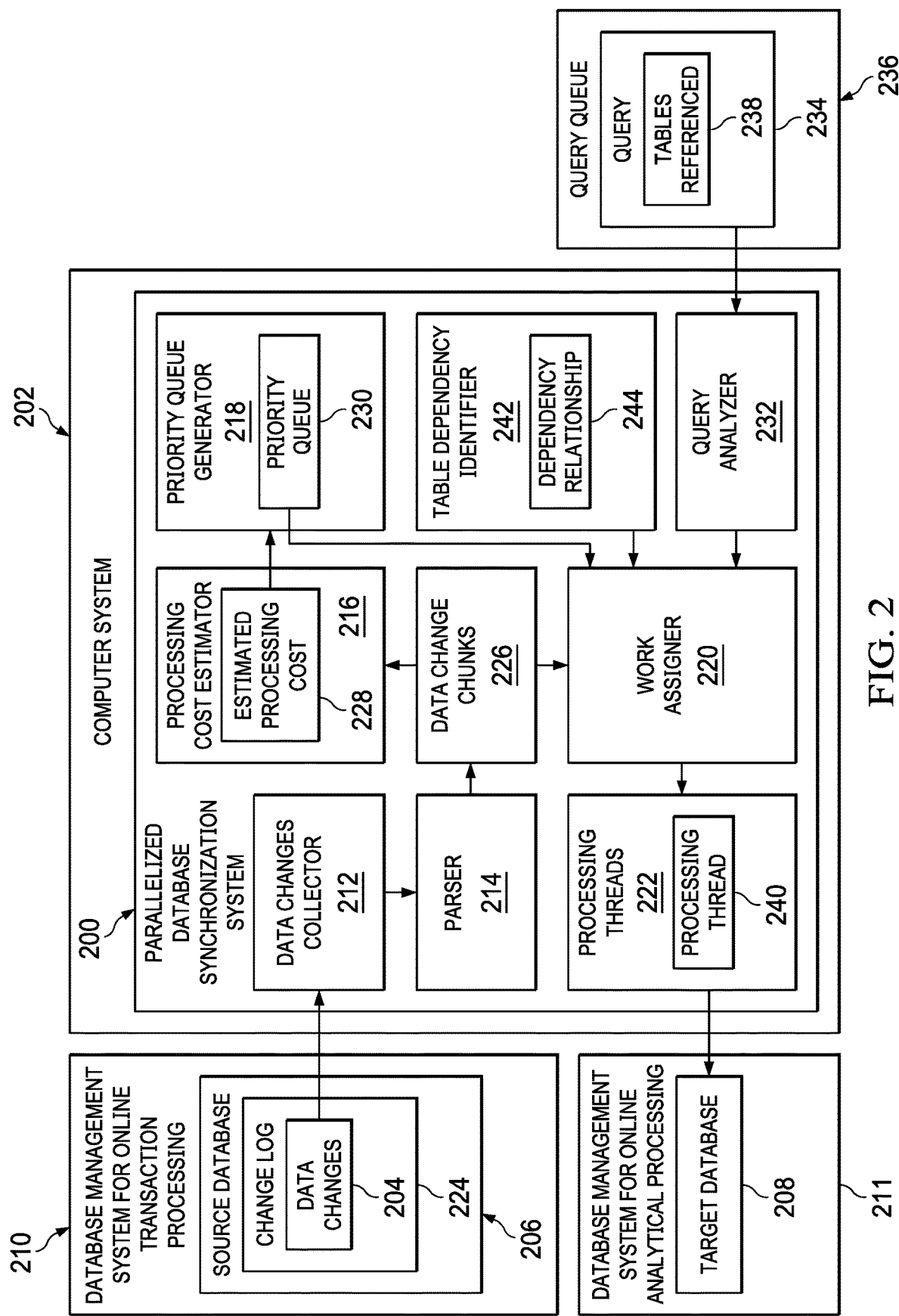
FIG. 2 is a block diagram of a parallelized database synchronization system in accordance with an illustrative embodiment.

With reference to FIG. 2, a block diagram of a parallelized database synchronization system is depicted in accordance with an illustrative embodiment. In this illustrative example, parallelized database synchronization system 200 includes components that can be implemented in hardware such as the hardware shown in network data processing system 100 in FIG. 1.

Parallelized database synchronization system 200 can be implemented in software, hardware, firmware or a combination thereof. When software is used, the operations performed by parallelized database synchronization system 200 can be implemented in program code configured to run on hardware, such as a processor unit. When firmware is used, the operations performed by parallelized database synchronization system 200 can be implemented in program code and data and stored in persistent memory to run on a processor unit. When hardware is employed, the hardware may include circuits that operate to perform the operations in parallelized database synchronization system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 202 is a physical hardware system and includes one or more data processing systems. When more than one data processing system is present in computer system 202, those data processing systems are in communication with each other using a communications medium. The communications medium can be a network. The data processing systems can be selected from at least one of a computer, a server computer, a tablet computer, or some other suitable data processing system.

Computer system 202 can be configured to implement parallelized database synchronization system 200 to perform at least one of the steps, operations, or actions described in the different illustrative examples using software, hardware, firmware or a combination thereof. As a result, computer system 202 operates as a special purpose computer system.

Parallelized database synchronization system 200 is configured to synchronize data changes 204 in source database 206 to target database 208. For example, without limitation, source database 206 may be a relational database in database management system for online transaction processing 210. Target database 208 may be a database in a database management system for online analytical processing 211. For example, without limitation, target database 208 may comprise a column store data structure or an accelerator.

Parallelized database synchronization system 200 may include data changes collector 212, parser 214, processing cost estimator 216, priority queue generator 218, work assigner 220, and plurality of processing threads 222. Data changes 204 in source database 206 may be recorded in change log 224. Change log 224 may comprise one or more change logs that may be implemented in any appropriate manner to indicated data changes 204 to source database 206 in any appropriate format.

Data changes collector 212 may be configured to identify data changes 204 to source database 206 from change log 224 and to read the identified data changes 204 from change log 224 in any known and appropriate manner. For example, without limitation, data changes collector 212 may be configured to identify and read data changes 204 to source database 206 from change log 224 continuously.

Parser 214 may be configured to read and process data changes 204 collected by data changes collector 212. For example, without limitation, parser 214 may be configured to read data changes 204 collected by data changes collector 212 from time to time in windows for processing. Parser processes data changes 204 identified in change log 224 of source database 206 and converts them into data change chunks 226 of data changes 204. For example, without limitation, data change chunks 226 of data changes 204 may be organized by table.

Processing cost estimator 216 is configured to determine estimated processing cost 228 for each of data change chunks 226. Processing cost estimator 216 may use any appropriate heuristic or cost function to determine estimated processing cost 228 for each of data change chunks 226 based on the nature of the table related activity data from the logs processed by parser 214. For example, without limitation, deletes may be weighted 2 times more than inserts to the table. Also, estimated processing cost 228 preferably may include data volume itself, not only number of rows. An example of a calculation of estimated processing cost 228 that may be used by processing cost estimator 216 is the following formula:

$$Cost=(NumberDeletedRows*2+NumberInsertedRows-NumberRollbackedRows)*AvgRowSize;$$

wherein: Cost is the estimated processing cost for a data change chunk, NumberDeletedRows is the number of rows of data deleted from a table by the data changes in the data change chunk, NumberInsertedRows is the number of rows of data inserted into the table by the data changes in the data change chunk, NumberRollbackedRows is the number of rows of data in the table for which data changes in the data change chunk are rolled back, and AvgRowSize is the average size of the rows of data in the table being changed by the data changes in the data change chunk.

Once estimated processing cost 228 is calculated for each of data change chunks 226, priority queue generator 218 generates priority queue 230. Data change chunks 226 may be identified in priority queue 230 in descending order of estimated processing cost 228, so that the data change chunk with the highest estimated processing cost 228 is at the front of priority queue 230.

Plurality of processing threads 222 may comprise any appropriate number of processing threads that are configured to provide multi-threaded processing of data change chunks 226 to apply data changes 204 identified in data change chunks 226 to target database 208. Work assigner 220 is configured to assign data change chunks 226 to individual processing threads in plurality of processing threads 222 from priority queue 230 in order by estimated processing cost 228, from higher estimated processing cost to lower estimated processing cost. For example, without limitation, the function of work assigner 220 may be implemented in processing threads 222, such that each processing thread 240 in processing threads 222 that is available to process data is configured to select the next data change chunk 226 identified in priority queue 230 that needs to be processed. Processing data change chunks 226 by processing threads 222 in order by estimated processing cost 228 in this manner provides an even workload distribution among processing threads 222 such that most or all processing threads 222 finish applying data changes 204 to target database 208 at the same time or at approximately the same time.

Parallelized database synchronization system 200 also may include query analyzer 232. Query analyzer 232 may be configured to detect query 234 to be performed on target database 208. For example, without limitation, query 234 may be in query queue 236 waiting to be run until data changes 204 are made to target database 208. Query analyzer 232 may be configured to identify tables referenced 238 in query 234. Work assigner 220 may be configured to assign the processing of data change chunks 226 that include data changes 204 for tables referenced 238 by query 234 from priority queue 230 to a single processing thread 240 in plurality of processing threads 222 to ensure atomicity and consistency of applying data changes 204 to target database 208 from the viewpoint of query 234.

Parallelized database synchronization system 200 also may include table dependency identifier 242. Table dependency identifier 242 may be configured to identify dependency relationship 244 between database tables to be updated with data changes 204. Identifying dependency relationship 244 involves understanding the table structure to determine the referential integrity constraints the table holds. For example, without limitation, table dependency identifier 242 may be configured to create a relationship graph based on tables definitions that maps the referential integrity constraints, such as primary/foreign keys.

Work assigner 220 may be configured to assign the processing of data change chunks 226 with data changes 204 for tables that are determined to have dependency relationship 244 to a single processing thread 240 in plurality of processing threads 222. For example, without limitation, data change chunks 226 from priority queue 230 for the current table and all other tables it depends on may be assigned to a single processing thread 240 for processing not only to ensure atomicity and consistency for the application of data changes 204 to target database 208, but also to the data in the tables as seen by query 234 waiting to reference it. Optionally, to avoid overloading everything on a single processing thread 240, a maximum number of skips may be allowed on a processing thread before the processing thread is forced to take next biggest available data change chunk 226 for processing.

The illustration of parallelized database synchronization system 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
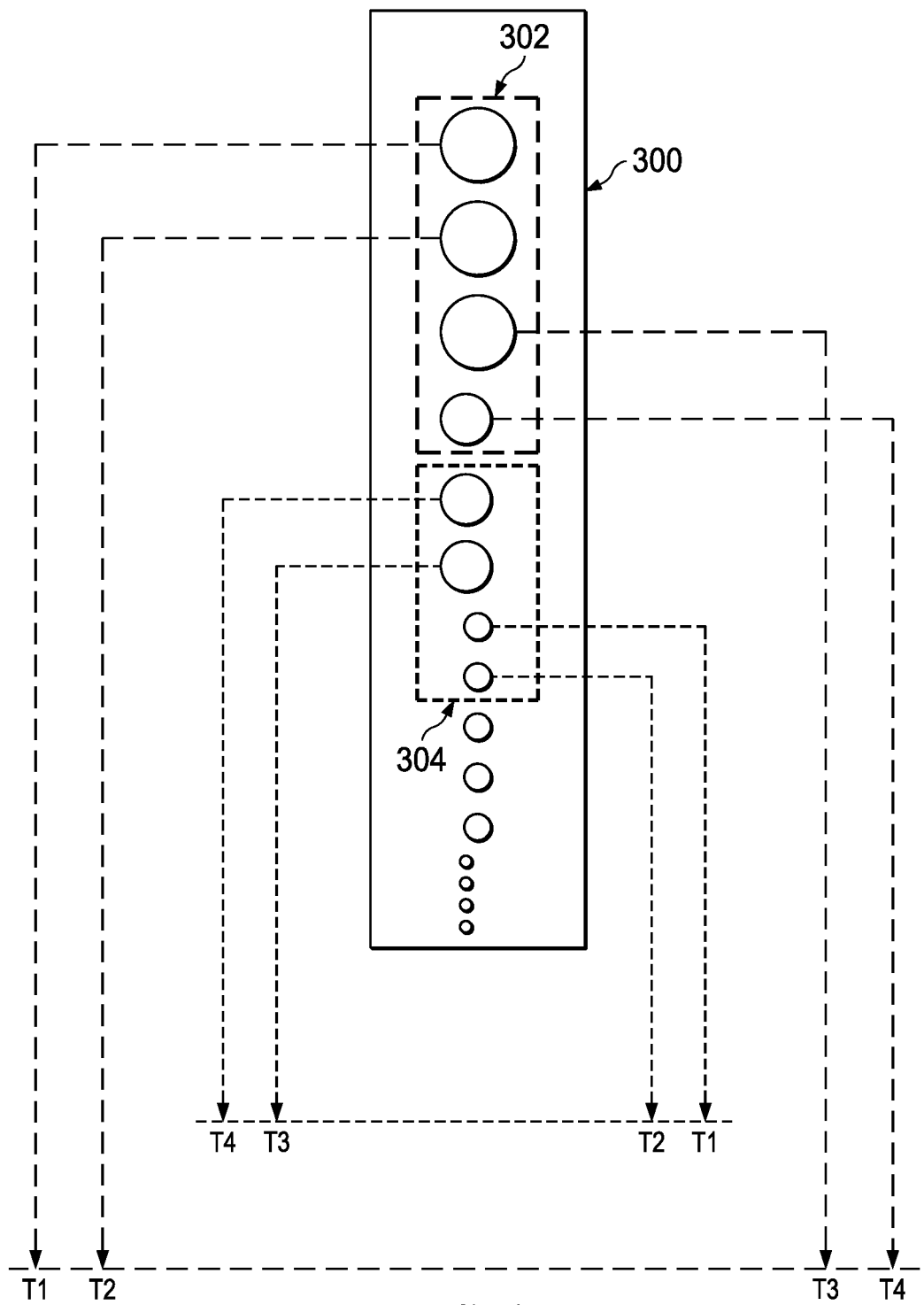
FIG. 3 is an illustration of an example of work assignment in parallelized database synchronization in accordance with an illustrative embodiment.

With reference to FIG. 3, an illustration of an example of work assignment in parallelized database synchronization is depicted in accordance with an illustrative embodiment. The process described with reference to FIG. 3 may be implemented, for example, in parallelized database synchronization system 200 in FIG. 2. Priority queue 300 in FIG. 3 is an example of one implementation of priority queue 230 in FIG. 2. Data change chunks identified in priority queue 300 are represented by circles. The estimated processing costs of the data change chunks identified in priority queue 300 are represented by the sizes of the circles. In accordance with an illustrative embodiment, data change chunks are identified in priority queue 300 in descending order of estimated processing cost, from higher estimated processing cost to lower estimated processing cost.

In this example, it is assumed that four processing threads T1, T2, T3, and T4 are configured to implement multi-threaded processing of the data change chunks identified in priority queue 300 to apply the data changes identified in the data change chunks to a target database. A system or method in accordance with an illustrative embodiment may comprise or use more or fewer than four processing threads for applying data changes to a target database.

In a first round of processing, the data change chunks in first group 302 of four data change chunks identified in priority queue 300 are assigned to the four processing threads for processing in order by estimated processing cost, from higher estimated processing cost to lower estimated processing cost. For example, in the first round of processing, each of the four processing threads may select one of the four data change chunks identified in first group 302 of data change chunks in priority queue 300 for processing in order from higher estimated processing cost to lower estimated processing cost. Processing of a data change chunk by a processing thread to apply data changes to a target database may begin as soon as the data change chunk is assigned to or selected by the processing thread.

In this example, processing thread T4 is assigned to process the data change chunk in first group 302 of data change chunks that has the lowest estimated processing cost. Therefore, processing thread T4 finishes processing in the first round of processing first. As soon as processing thread T4 is finished processing in the first round of processing, processing thread T4 may be assigned to begin processing the data change chunk having the highest estimated processing cost in second group 304 of data change chunks identified in priority queue 300. By repeating this process, processing of the data change chunks identified in priority queue 300 may be distributed evenly across the processing threads so that all of the processing threads are kept busy and are likely to finish processing of all of the data change chunks identified in priority queue 300 at the same time or almost the same time.

Figure 4:
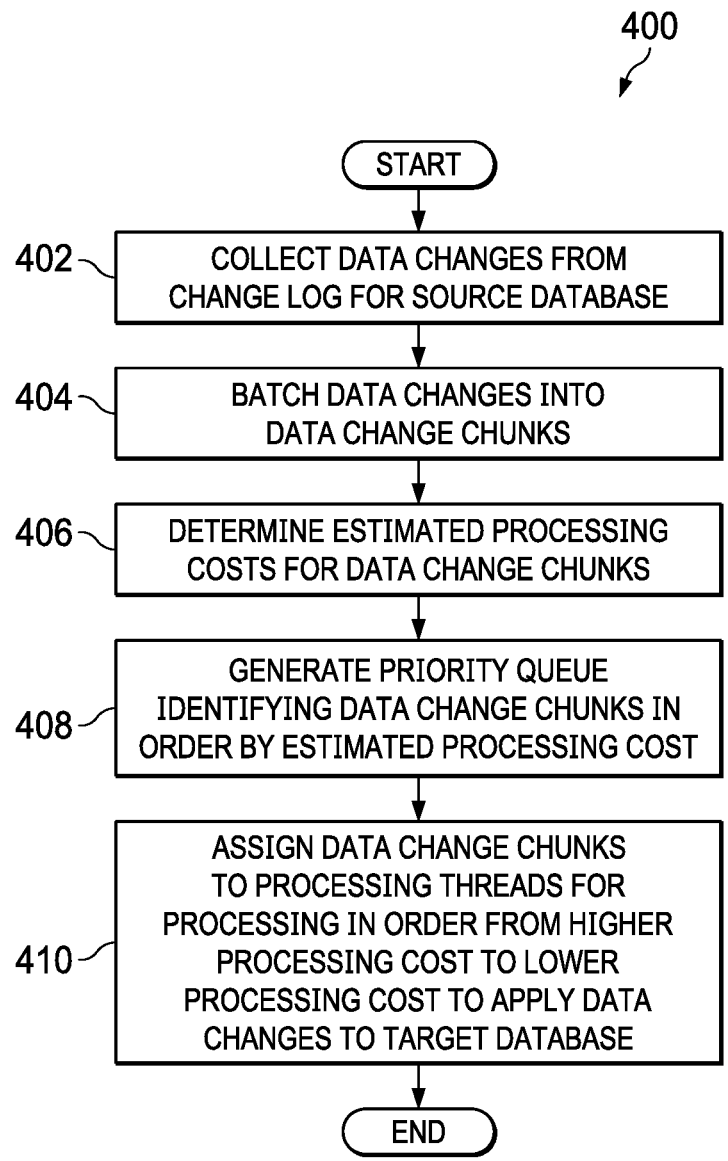
FIG. 4 is an illustration of a flowchart of a process of work assignment in parallelized database synchronization in accordance with an illustrative embodiment.

With reference to FIG. 4, an illustration of a flowchart of a process of work assignment in parallelized database synchronization is depicted in accordance with an illustrative embodiment. Process 400 may be implemented, for example, in parallelized database synchronization system 200 in FIG. 2.

Process 400 may begin with collecting data changes from the change log for a source database (operation 402). The collected data changes may then be batched into data change chunks (operation 404). An estimated processing cost may be determined for each data change chunk (operation 406). A priority queue may then be generated in which the data change chunks are identified in order by estimated processing cost (operation 408). The data change chunks then may be assigned to processing threads in order from higher processing cost to lower processing cost for processing to apply the data changes to a target database (operation 410), with the process terminating thereafter.

Figure 5:
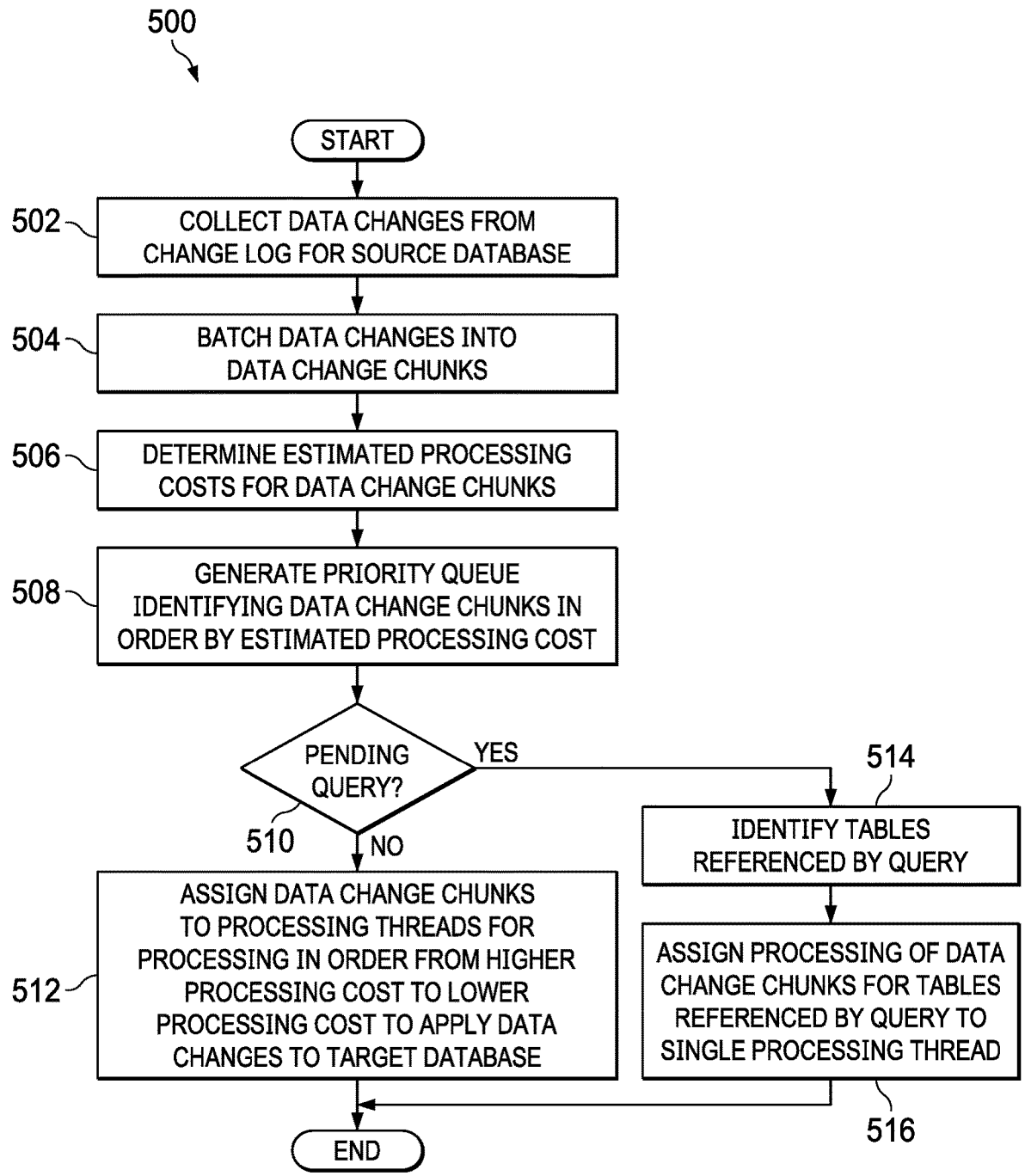
FIG. 5 is an illustration of a flowchart of an alternative process of work assignment in parallelized database synchronization in accordance with an illustrative embodiment.

With reference to FIG. 5, an illustration of a flowchart of an alternative process of work assignment in parallelized database synchronization is depicted in accordance with an illustrative embodiment. Process 500 may be implemented, for example, in parallelized database synchronization system 200 in FIG. 2.

Process 500 may begin with collecting data changes from the change log for a source database (operation 502). The collected data changes may then be batched into data change chunks (operation 504). An estimated processing cost may be determined for each data change chunk (operation 506). A priority queue may then be generated in which the data change chunks are identified in order by estimated processing cost (operation 508). It then may be determined whether there is a pending query to the target database (operation 510). In response to a determination that there is not a pending query, the data change chunks may be assigned to processing threads in order from higher processing cost to lower processing cost for processing to apply the data changes to the target database (operation 512), with the process terminating thereafter.

In response to a determination at operation 510 that there is a pending query, the query may be parsed to identify tables referenced by the query (operation 514). The processing of all data change chunks with data changes for the tables referenced by the query then may be assigned to a single processing thread for processing (operation 516), with the process terminating thereafter.

Figure 6:
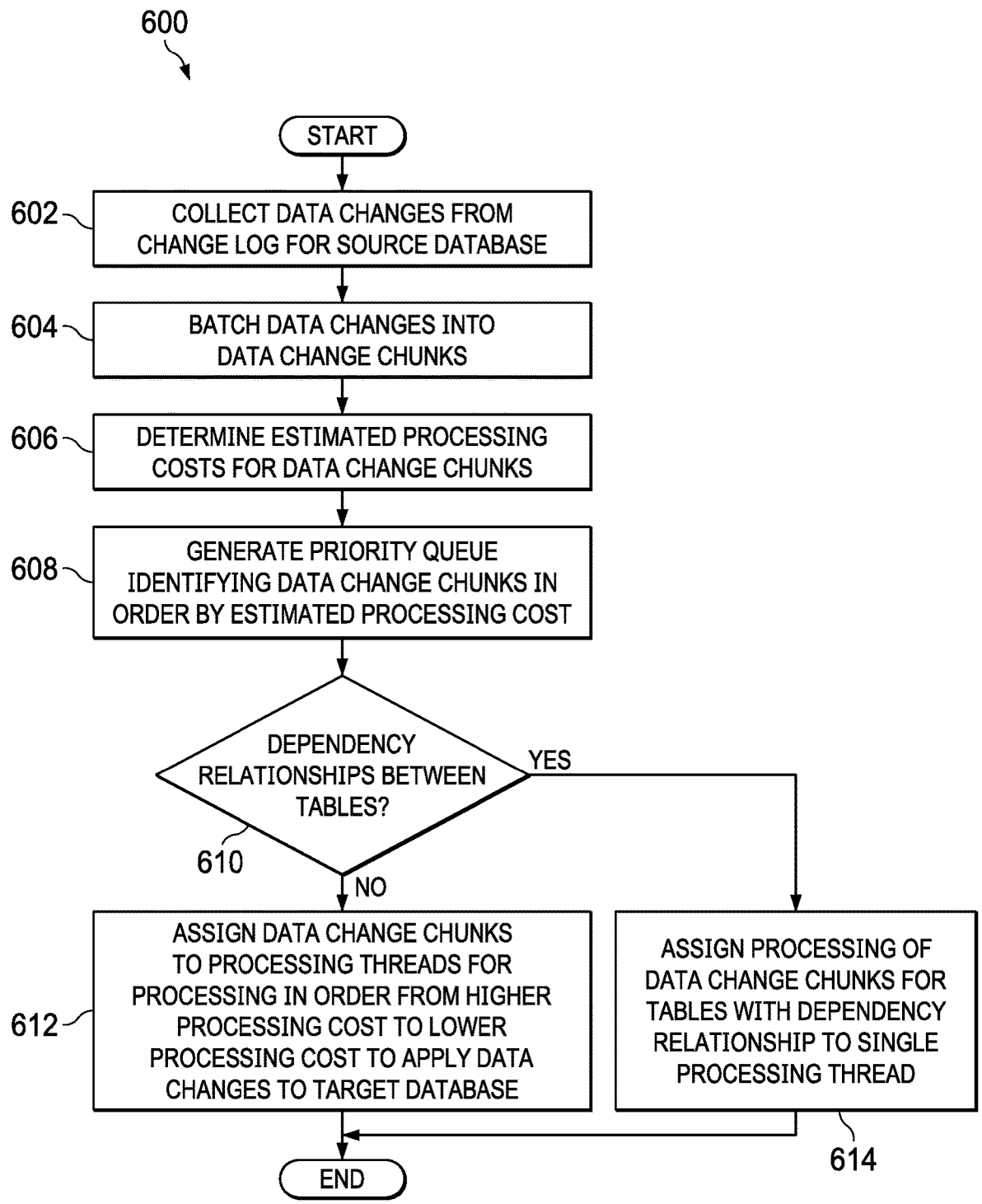
FIG. 6 is an illustration of a flowchart of another alternative process of work assignment in parallelized database synchronization in accordance with an illustrative embodiment.

With reference to FIG. 6, an illustration of a flowchart of another alternative process of work assignment in parallelized database synchronization is depicted in accordance with an illustrative embodiment. Process 600 may be implemented, for example, in parallelized database synchronization system 200 in FIG. 2.

Process 600 may begin with collecting data changes from the change log for a source database (operation 602). The collected data changes may then be batched into data change chunks (operation 604). An estimated processing cost may be determined for each data change chunk (operation 606). A priority queue may then be generated in which the data change chunks are identified in order by estimated processing cost (operation 608). It then may be determined whether there are dependency relationships between tables to be changed by processing of the data change chunks (operation 610). In response to a determination that there is not a dependency relationship between tables, the data change chunks may be assigned to processing threads in order from higher processing cost to lower processing cost for processing to apply the data changes to the target database (operation 612), with the process terminating thereafter. In response to a determination at operation 610 that there are dependency relationships between tables, the processing of data change chunks with data changes for tables that have identified dependency relationships may be assigned to a single processing thread for processing (operation 614), with the process terminating thereafter.

Figure 7:
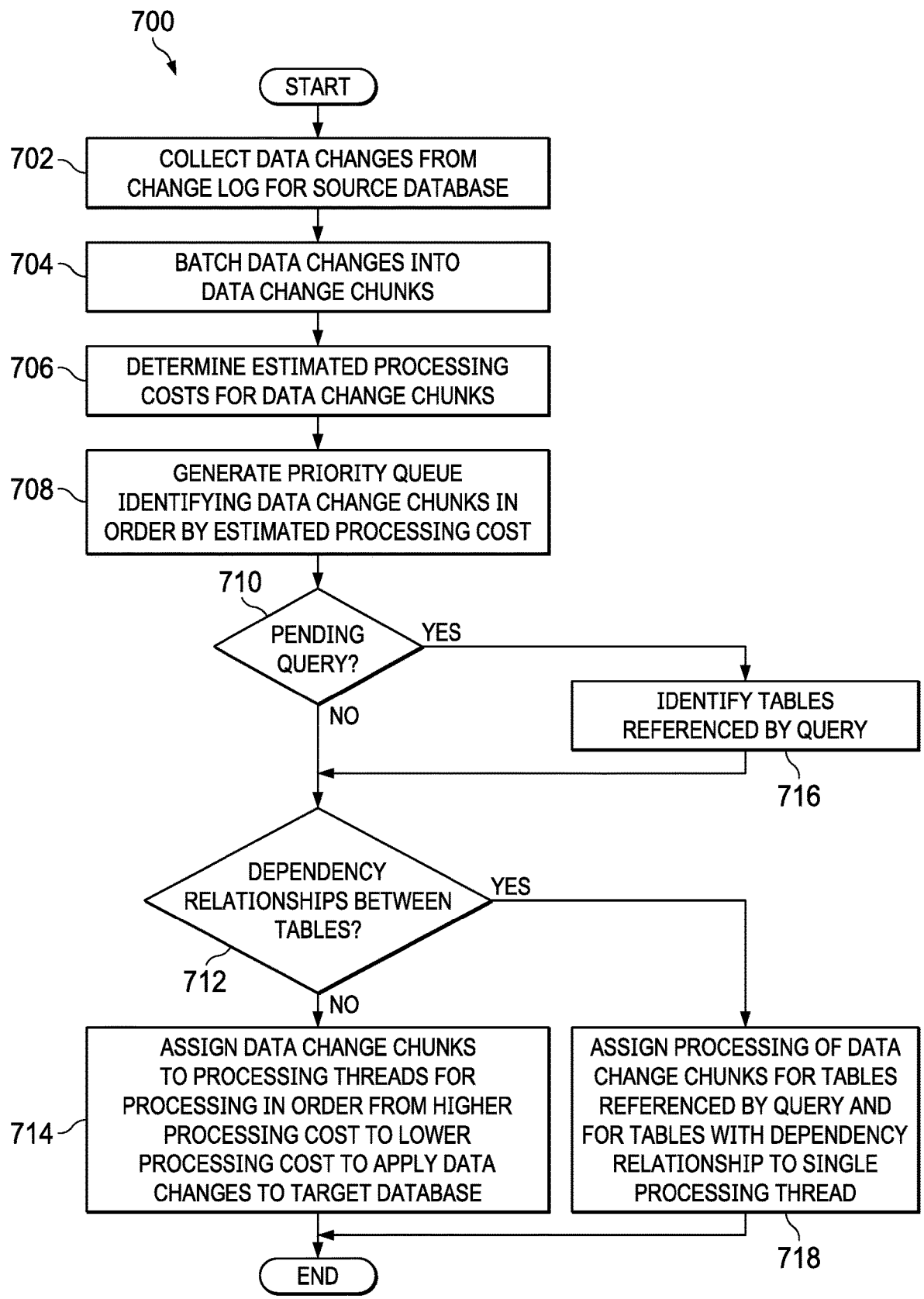
FIG. 7 is an illustration of a flowchart of a further alternative process of work assignment in parallelized database synchronization in accordance with an illustrative embodiment.

With reference to FIG. 7, an illustration of a flowchart of a further alternative process of work assignment in parallelized database synchronization is depicted in accordance with an illustrative embodiment. Process 700 may be implemented, for example, in parallelized database synchronization system 200 in FIG. 2.

Process 700 may begin with collecting data changes from the change log for a source database (operation 702). The collected data changes may then be batched into data change chunks (operation 704). An estimated processing cost may be determined for each data change chunk (operation 706). A priority queue may then be generated in which the data change chunks are identified in order by estimated processing cost (operation 708). It then may be determined whether there is a pending query to the target database (operation 710). In response to a determination that there is not a pending query, it then may be determined whether there are dependency relationships between tables to be changed by processing of the data change chunks (operation 712). In response to a determination that there is not a dependency relationship between tables, the data change chunks may be assigned to processing threads for processing in order from higher processing cost to lower processing cost to apply the data changes to the target database (operation 714), with the process terminating thereafter.

In response to a determination at operation 710 that there is a pending query, the query may be parsed to identify tables referenced by the query (operation 716). The process may then proceed to operation 712 to determine whether there are dependency relationships between tables. In response to a determination at operation 712 that there are dependency relationships between tables, the processing of data change chunks with data changes for the tables referenced by the query and of data change chunks with data changes for tables that have identified dependency relationships may be assigned to a single processing thread for processing (operation 718), with the process terminating thereafter.

The processes in FIGS. 4-7 can be implemented in hardware, software, or both. When implemented in software, the processes can take the form of program code that is run by one or more processor units located in one or more hardware devices in one or more computer systems.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
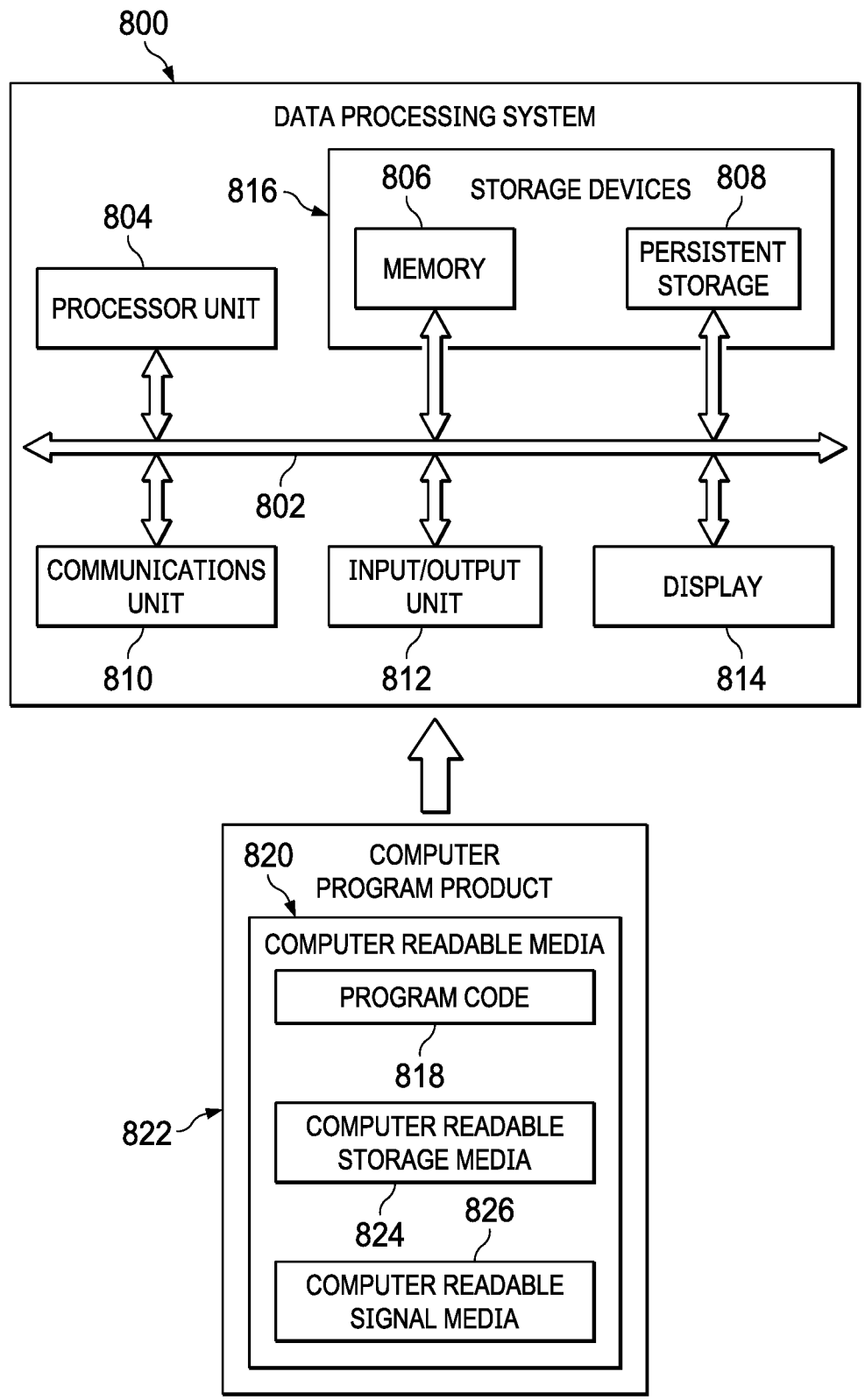
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement server computer 104, server computer 106, client computer 110, client computer 112, and client computer 114 in FIG. 1. Data processing system 800 can also be used to implement computer system 202 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of work assignment for parallelized database synchronization, comprising:
    identifying data changes to a source database from a change log for the source database;
    batching the data changes into data change chunks of data changes;
    determining an estimated processing cost for processing of each of the data change chunks to apply the data changes in the data change chunks to a target database;
    generating a priority queue in which the data change chunks are identified in order of estimated processing cost;
    assigning each data change chunk identified in the priority queue to a processing thread in a plurality of processing threads for processing in order by estimated processing cost from higher estimated processing cost to lower estimated processing cost to apply the data changes in the data change chunks to the target database;
    identifying tables referenced by a query for the target database that is queued for processing until the data changes are applied to the target database; and
    assigning each data change chunk with data changes for the tables referenced by the query to a single processing thread in the plurality of processing threads for processing, wherein batching the data changes into data change chunks comprises batching the data changes into data change chunks of data changes organized by table in the target database.

2. The computer-implemented method of claim 1, wherein:
    the source database is a database in a database management system for online transaction processing; and
    the target database is a database in a database management system for online analytical processing.

3. The computer-implement method of claim 1, wherein determining the estimated processing cost for processing each of the data change chunks comprises using the following formula to determine the estimated processing cost for each of the data change chunks:

$$Cost=(NumberDeletedRows*2+NumberInsertedRows-NumberRollbackedRows)*AvgRowSize;$$

wherein:
    Cost is the estimated processing cost for a data change chunk,
    NumberDeletedRows is the number of rows of data deleted from a table by the data changes in the data change chunk,
    NumberInsertedRows is the number of rows of data inserted into the table by the data changes in the data change chunk,
    NumberRollbackedRows is the number of rows of data in the table for which data changes in the data change chunk are rolled back, and
    AvgRowSize is the average size of the rows of data in the table being changed by the data changes in the data change chunk.

4. The computer-implemented method of claim 1 further comprising:
    identifying data change chunks with data changes for tables to be changed that have a dependency relationship with one another; and
    assigning the data change chunks with the data changes for the tables to be changed that have the dependency relationship to a single processing thread in the plurality of processing threads for processing.

5. The computer-implemented method of claim 1 further comprising:
    identifying tables referenced by a query for the target database that is queued for processing until the data changes are applied to the target database;
    identifying data change chunks with data changes for tables to be changed that have a dependency relationship with one another to the tables referenced by the query; and
    assigning each data change chunk with data changes for the tables referenced by the query and the data change chunks with the data changes for the tables to be changed that have the dependency relationship to the tables referenced by the query to a single processing thread in the plurality of processing threads for processing.

6. A system for work assignment for parallelized database synchronization, comprising a data processing system configured to:
    identify data changes to a source database from a change log for the source database;
    batch the data changes into data change chunks of data changes;
    determine an estimated processing cost for processing of each of the data change chunks to apply the data changes in the data change chunks to a target database;
    generate a priority queue in which the data change chunks are identified in order of estimated processing cost;
    assign each data change chunk identified in the priority queue to a processing thread in a plurality of processing threads for processing in order by estimated processing cost from higher estimated processing cost to lower estimated processing cost to apply the data changes in the data change chunks to the target databases;
    identify tables referenced by a query for the target database that is queued for processing until the data changes are applied to the target database; and assign each data change chunk with data changes for the tables referenced by the query to a single processing thread in the plurality of processing threads for processing, wherein the data processing system is configured to batch the data changes into the data change chunks of data changes organized by table in the target database.

7. The system of claim 6, wherein:
the source database is a database in a database management system for online transaction processing; and
the target database is a database in a database management system for online analytical processing.

8. The system of claim 6, wherein the data processing system is configured to use the following formula to determine the estimated processing cost for processing each of the data change chunks:

$$Cost=(NumberDeletedRows*2+NumberinsertedRows-NumberRollbackedRows)*AvgRowSize;$$

wherein:
Cost is the estimated processing cost for a data change chunk,
NumberDeletedRows is the number of rows of data deleted from a table by the data changes in the data change chunk,
NumberinsertedRows is the number of rows of data inserted into the table by the data changes in the data change chunk,
NumberRollbackedRows is the number of rows of data in the table for which data changes in the data change chunk are rolled back, and
AvgRowSize is the average size of the rows of data in the table being changed by the data changes in the data change chunk.

9. The system of claim 6, wherein the data processing system is further configured to:
identify data change chunks with data changes for tables to be changed that have a dependency relationship with one another; and
assign the data change chunks with the data changes for the tables to be changed that have the dependency relationship to a single processing thread in the plurality of processing threads for processing.

10. The system of claim 6, wherein the data processing system is further configured to:
identify tables referenced by a query for the target database that is queued for processing until the data changes are applied to the target database;
identify data change chunks with data changes for tables to be changed that have a dependency relationship with one another to the tables referenced by the query; and
assign each data change chunk with data changes for the tables referenced by the query and the data change chunks with the data changes for the tables to be changed that have the dependency relationship to the tables referenced by the query to a single processing thread in the plurality of processing threads for processing.

11. A non-transitory computer readable storage medium storing program code, which when executed by a processor performs a computer-implemented method of work assignment for parallelized database synchronization, comprising:
identifying data changes to a source database from a change log for the source database;
batching the data changes into data change chunks of data changes;
determining an estimated processing cost for processing of each of the data change chunks to apply the data changes in the data change chunks to a target database;
generating a priority queue in which the data change chunks are identified in order of estimated processing cost;
assigning each data change chunk identified in the priority queue to a processing thread in a plurality of processing threads for processing in order by estimated processing cost from higher estimated processing cost to lower estimated processing cost to apply the data changes in the data change chunks to the target database;
identifying tables referenced by a query for the target database that is queued for processing until the data changes are applied to the target database; and
assigning each data change chunk with data changes for the tables referenced by the query to a single processing thread in the plurality of processing threads for processing, wherein the program code for batching the data changes into data change chunks comprises program code for batching the data changes into data change chunks of data changes organized by table in the target database.

12. The non-transitory computer readable storage medium of claim 11, wherein:
the source database is a database in a database management system for online transaction processing; and
the target database is a database in a database management system for online analytical processing.

13. The non-transitory computer readable storage medium of claim 11, wherein the program code for determining the estimated processing cost for processing each of the data change chunks comprises program code for using the following formula to determine the estimated processing cost for each of the data change chunks:

$$Cost=(NumberDeletedRows*2+NumberinsertedRows-NumberRollbackedRows)*AvgRowSize;$$

wherein:
Cost is the estimated processing cost for a data change chunk,
NumberDeletedRows is the number of rows of data deleted from a table by the data changes in the data change chunk,
NumberinsertedRows is the number of rows of data inserted into the table by the data changes in the data change chunk,
NumberRollbackedRows is the number of rows of data in the table for which data changes in the data change chunk are rolled back, and
AvgRowSize is the average size of the rows of data in the table being changed by the data changes in the data change chunk.

14. The non-transitory computer readable storage medium of claim 11 further comprising program code stored on the non-transitory computer readable storage medium for:
identifying data change chunks with data changes for tables to be changed that have a dependency relationship with one another; and
assigning the data change chunks with the data changes for the tables to be changed that have the dependency relationship with one another to a single processing thread in the plurality of processing threads for processing.

* * * * *